(12) United States Patent
English

(10) Patent No.: US 7,017,941 B2
(45) Date of Patent: Mar. 28, 2006

(54) WALKING BEAM ASSEMBLY

(75) Inventor: Raymond William English, Edmonton (CA)

(73) Assignee: Raydan Manufacturing Inc., Nisku (CA)

( * ) Notice: Subject to any disclaimer, the term of this patent is extended or adjusted under 35 U.S.C. 154(b) by 11 days.

(21) Appl. No.: 10/616,450

(22) Filed: Jul. 9, 2003

(65) Prior Publication Data

US 2004/0026900 A1    Feb. 12, 2004

(51) Int. Cl.
*B60G 5/02*    (2006.01)

(52) U.S. Cl. ............................ 280/677
(58) Field of Classification Search ........... 280/124.11, 280/124.128, 124.153, 677
See application file for complete search history.

(56) References Cited

U.S. PATENT DOCUMENTS

| 1,925,536 | A | * | 9/1933 | Judd | 410/28.1 |
|---|---|---|---|---|---|
| 2,323,669 | A | * | 7/1943 | Murty et al. | 180/409 |
| 2,339,539 | A | * | 1/1944 | Zeilman | 280/677 |
| 2,493,004 | A | * | 1/1950 | Mackie | 280/677 |
| 2,493,024 | A | * | 1/1950 | Pointer | 280/685 |
| 2,775,466 | A | * | 12/1956 | Meewes | 280/677 |
| 3,101,958 | A | * | 8/1963 | Geron | 280/423.1 |
| 3,349,863 | A | * | 10/1967 | Wagner | 180/24.08 |
| 3,397,896 | A | * | 8/1968 | Willetts | 280/677 |
| 3,471,166 | A | * | 10/1969 | Clark | 280/676 |
| 4,029,165 | A | | 6/1977 | Miller et al. | 180/6.48 |
| 4,108,470 | A | * | 8/1978 | Vinton | 280/677 |
| 4,120,509 | A | | 10/1978 | Reeve et al. | 280/81 |
| 4,140,193 | A | | 2/1979 | Miller | 180/9.46 |
| 4,923,204 | A | | 5/1990 | Henderson | 280/407.1 |
| 5,228,718 | A | | 7/1993 | Kooistra | 280/678 |
| 5,364,113 | A | | 11/1994 | Goertzen | 280/81.6 |
| 6,193,266 | B1 | * | 2/2001 | Cortez et al. | 280/677 |
| 6,224,074 | B1 | | 5/2001 | Cadden | 280/86.75 |
| 6,264,231 | B1 | * | 7/2001 | Scully | 280/680 |
| 6,460,872 | B1 | | 10/2002 | Cadden | 280/678 |
| 6,585,286 | B1 | * | 7/2003 | Adema et al. | 280/677 |
| 6,666,474 | B1 | * | 12/2003 | Pavuk | 280/677 |
| 6,916,037 | B1 | * | 7/2005 | Baxter et al. | 280/683 |

* cited by examiner

*Primary Examiner*—Paul N. Dickson
*Assistant Examiner*—Laura B. Rosenberg
(74) *Attorney, Agent, or Firm*—Davis & Bujold, P.L.L.C.

(57) ABSTRACT

A walking beam assembly includes a pair of axles in parallel spaced relation. At least one of the pair of axles being a drop axles having end portions and an intermediate portion that extends between the end portions. The intermediate portion drops down and has a secondary axis which is offset from and substantially parallel to a primary axis provided by the end portions. A pair of walking beams extend in parallel spaced relation between the pair of axles. Each walking beam has opposed ends, a central transverse pivot axis intermediate the opposed ends, and a longitudinal pivot axis. The opposed ends of each walking beam are secured via connectors on top of the intermediate portion of the at least one drop axle adjacent one of the end portions. Each of the connectors allow limited pivotal movement about the longitudinal pivot axis of the walking beam.

10 Claims, 12 Drawing Sheets

WALKING BEAM ASSEMBLY

FIELD OF THE INVENTION

The present invention relates to a walking beam assembly and, more specifically, a walking beam assembly designed for use with a drop axle.

BACKGROUND OF THE INVENTION

A drop axle is commonly used on the front of many makes and models of vehicles, particularly in a steering application. Each drop axle has end portions, which support wheel mountings onto which wheels are mounted. It is termed a "drop" axle due to the fact that an intermediate portion, between the end portions, drops down and has a secondary axis, which is offset from and substantially parallel to a primary axis provided by the end portions.

Walking beams are used on many makes and models of vehicle to connect the axles. The beams are connected to the axles from below at their beam-ends. A suspension is mounted to the centre of the beams and serves to connect the beams and axle assembly to the vehicle frame. Front to rear torque rods are generally provided to control movement of the axle assembly during braking and acceleration. An example of a walking beam assembly is U.S. Pat. No. 5,228,718 (Kooistra 1993) currently owned and manufactured by Raydan Manufacturing Inc.

Vehicles having two drop axles are generally not equipped with walking beam assemblies. The reason for this is that the dropping down of the intermediate portion of the drop axle decreases ground clearance for the attachment of a walking beam. If any current models of walking beams were attached between two drop axles, there would not be sufficient room for a suspension between the beams and the vehicle frame. It would also restrict the articulation of the axles leaving the walking beams incapable of evenly distributing weight. These two factors would completely defeat the purpose of the walking beam.

SUMMARY OF THE INVENTION

What is required is a walking beam assembly designed for use with a drop axle.

According to the present invention there is provided a walking beam assembly which includes a pair of axles in parallel spaced relation. At least one of the pair of axles is a drop axle having end portions and an intermediate portion that extends between the end portions. The intermediate portion drops down and has a secondary axis which is offset from and substantially parallel to a primary axis provided by the end portions. A pair of walking beams extend in parallel spaced relation between the pair of drop axles. Each walking beam has opposed ends, a central transverse pivot axis intermediate the opposed ends, and a longitudinal pivot axis. The opposed ends of each walking beam are secured via connectors on top of the intermediate portion of the drop axles adjacent one of the end portions. Each of the connectors allow limited pivotal movement about the longitudinal pivot axis of the walking beam.

With the walking beam assembly, as described above, achieves the necessary clearance to accommodate a drop axle, by altering attachment points and the relationship of pivot points. The attachment of the walking beam to the drop axle in this manner also eliminates the need for front and rear torque rods to control movement of the axle assembly during braking and acceleration.

There are various ways in which the walking beams may be mounted to the top of the intermediate portion of each of the drop axles. One way is to weld the connector in position on top of the intermediate portion of each of the drop axles. A detachable means of attachment is preferred. Even more beneficial results may, therefore, be obtained when mounting plates are positioned onto the top of the intermediate portion of each drop axle, each of the mounting plates having bolt receiving apertures, each of the connectors being secured in position by bolts extending through the apertures and secured by nuts.

There are various forms of connectors which may be used to provide for some pivotal movement along the longitudinal axis of the walking beams. One form of connector, which will hereinafter be illustrated and described, is a cylindrical pin surrounded by a bushing. The cylindrical pin rotates relative to the bushing to accommodate movement, Another form of connector, which will also hereinafter be illustrated and described, is a resilient flexible element which deforms to accommodate movement. It is preferred that an upper resilient element and a lower resilient element be provided with one of the opposed ends of one of the walking beams sandwiched in between.

The walking beam assembly, as described above, must be secured in a longitudinal orientation to a frame of a vehicle for pivotal movement about the central transverse pivot axis. The suspension necessary to accomplish this may sold with the walking beam assembly or may be sold separately. The suspension which will hereinafter be illustrated and described, is one which is preferred and includes a pair of suspension arms. Each suspension arm has a pivotal connection at one end adapted for pivotally securing the suspension arm to a vehicle frame. A support bracket is provided for pivotally supporting one of the walking beams from the suspension arm for pivotal movement about the central transverse pivot axis. Shock absorbers are provided which are adapted to be disposed between the suspension arm and the vehicle frame.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
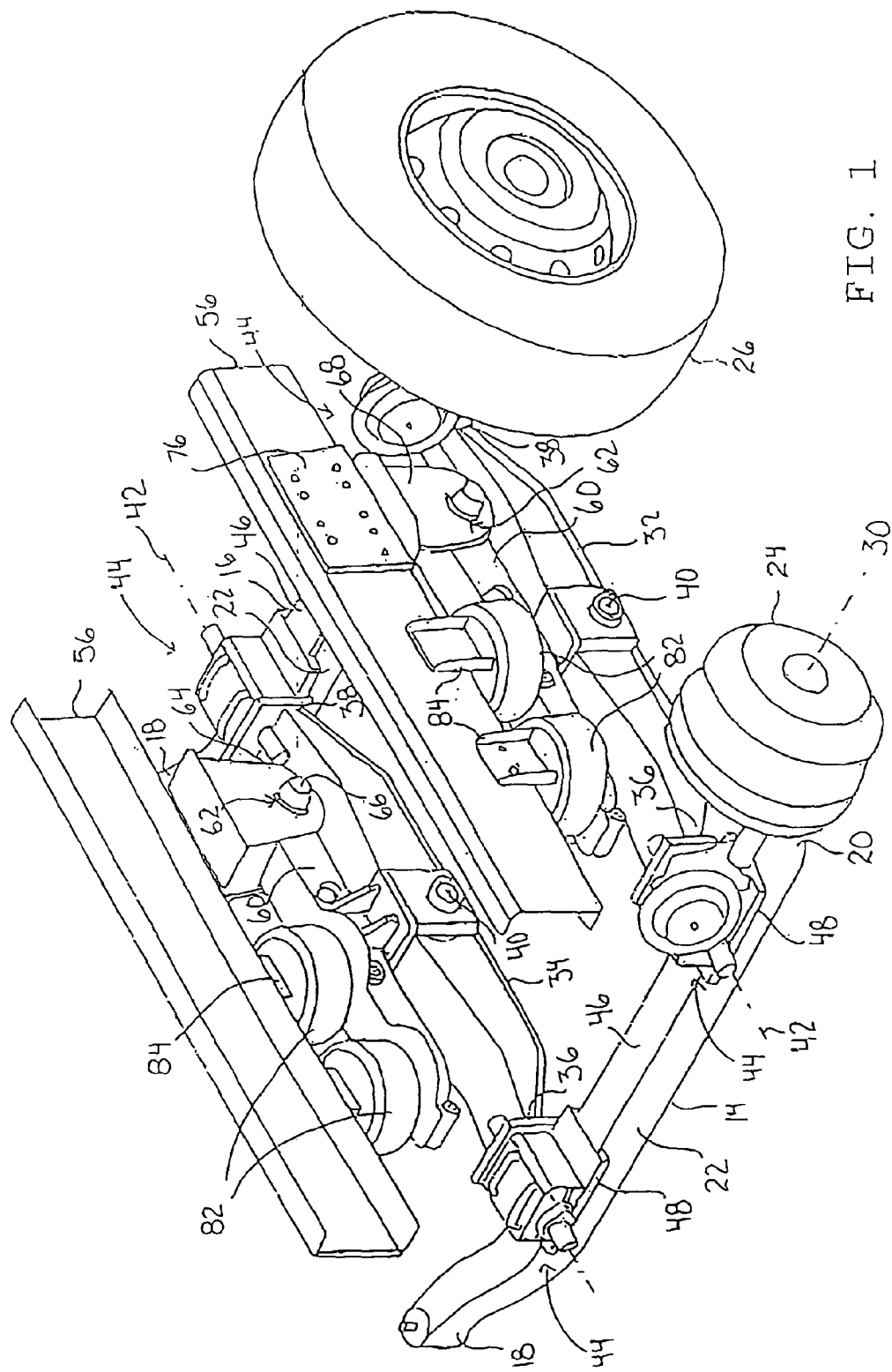
FIG. 1 is a perspective view of a walking beam assembly constructed in accordance with the teachings of the present invention.

The preferred embodiment, a walking beam assembly generally identified by reference numeral 10, will now be described with reference to FIGS. 1 through 10.

Figure 2:
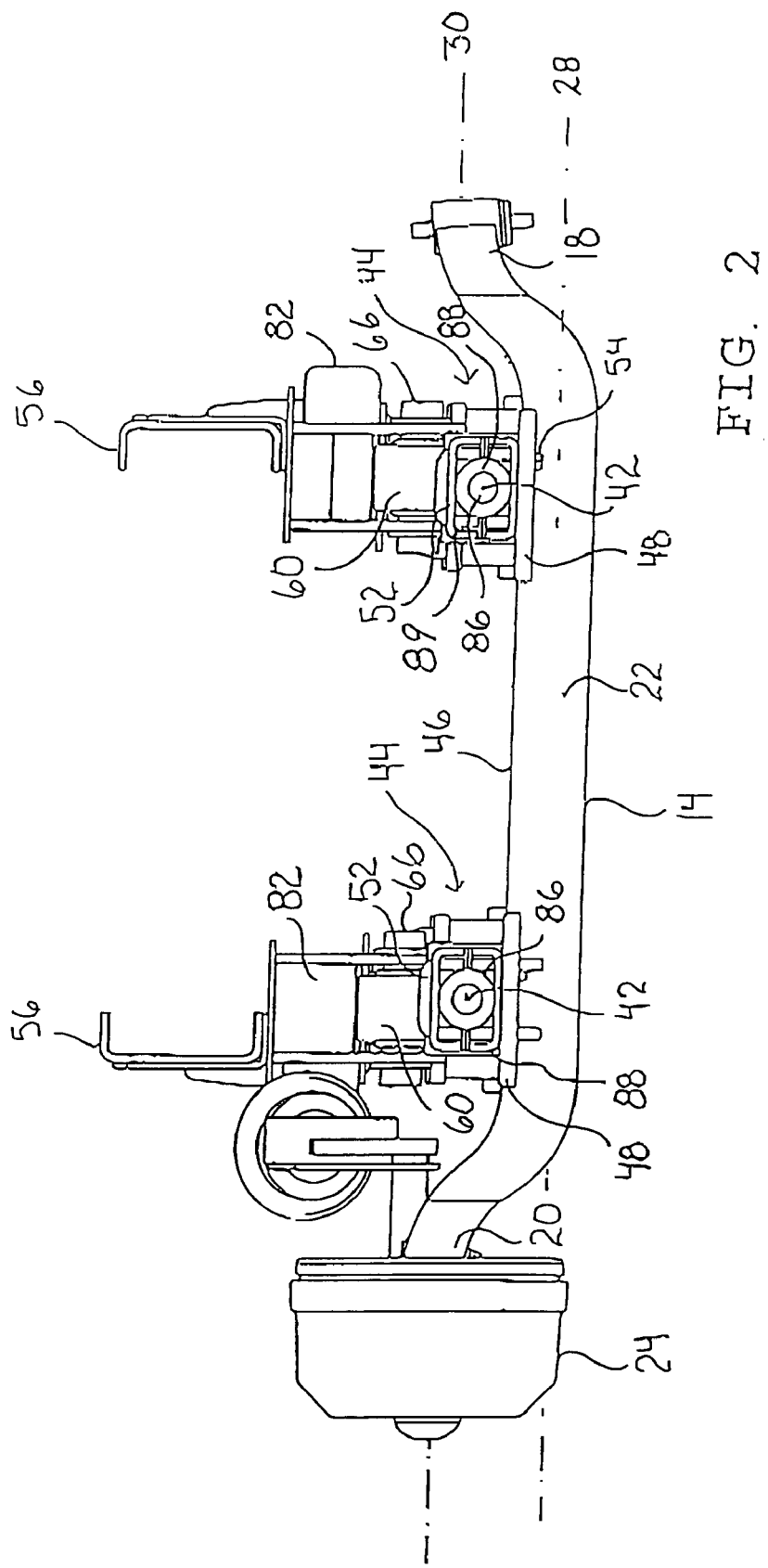
FIG. 2 is a front elevation view of the walking beam assembly illustrated in FIG. 1.

Structure and Relationship of Parts:

Referring to FIG. 1, walking beam assembly 10 includes a first drop axle 14 and a second drop axle 16. First drop axle 14 and second drop axle 16 each have a first end portion 18, a second end portion 20, and an intermediate portion 22 that extends between first end portion 18 and second end portion 20. First end portion 18 and second end portion 20 support wheel mountings 24 which are adapted to receive wheels 26. Referring to FIG. 2, intermediate portion 22 drops down and has a secondary axis 28 which is offset from and substantially parallel to a primary axis 30 provided by first end portion 18 and second end portion 20.

Figure 3:
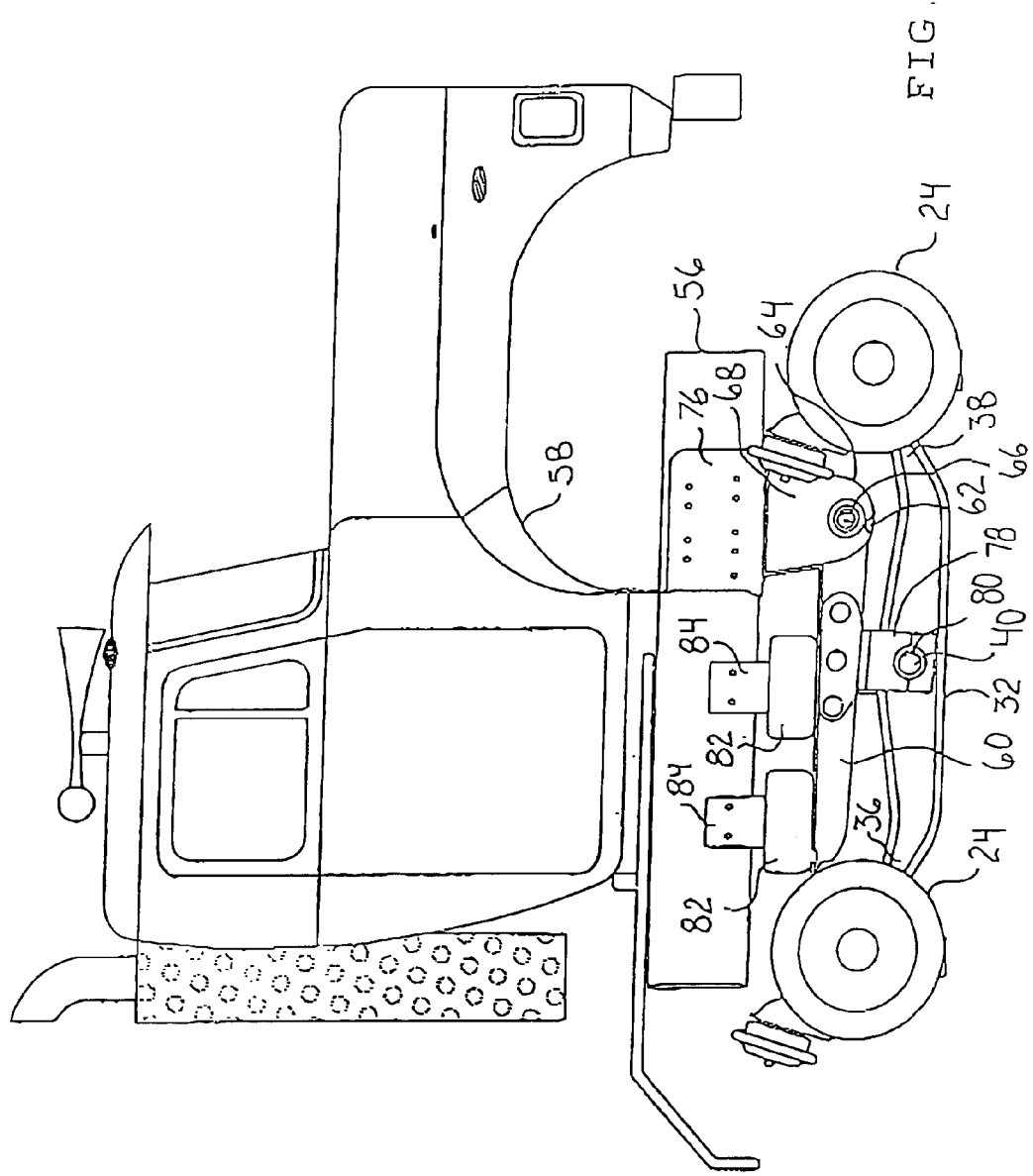
FIG. 3 is a side elevation view of the walking beam assembly illustrated in FIG. 1.
Figure 4:
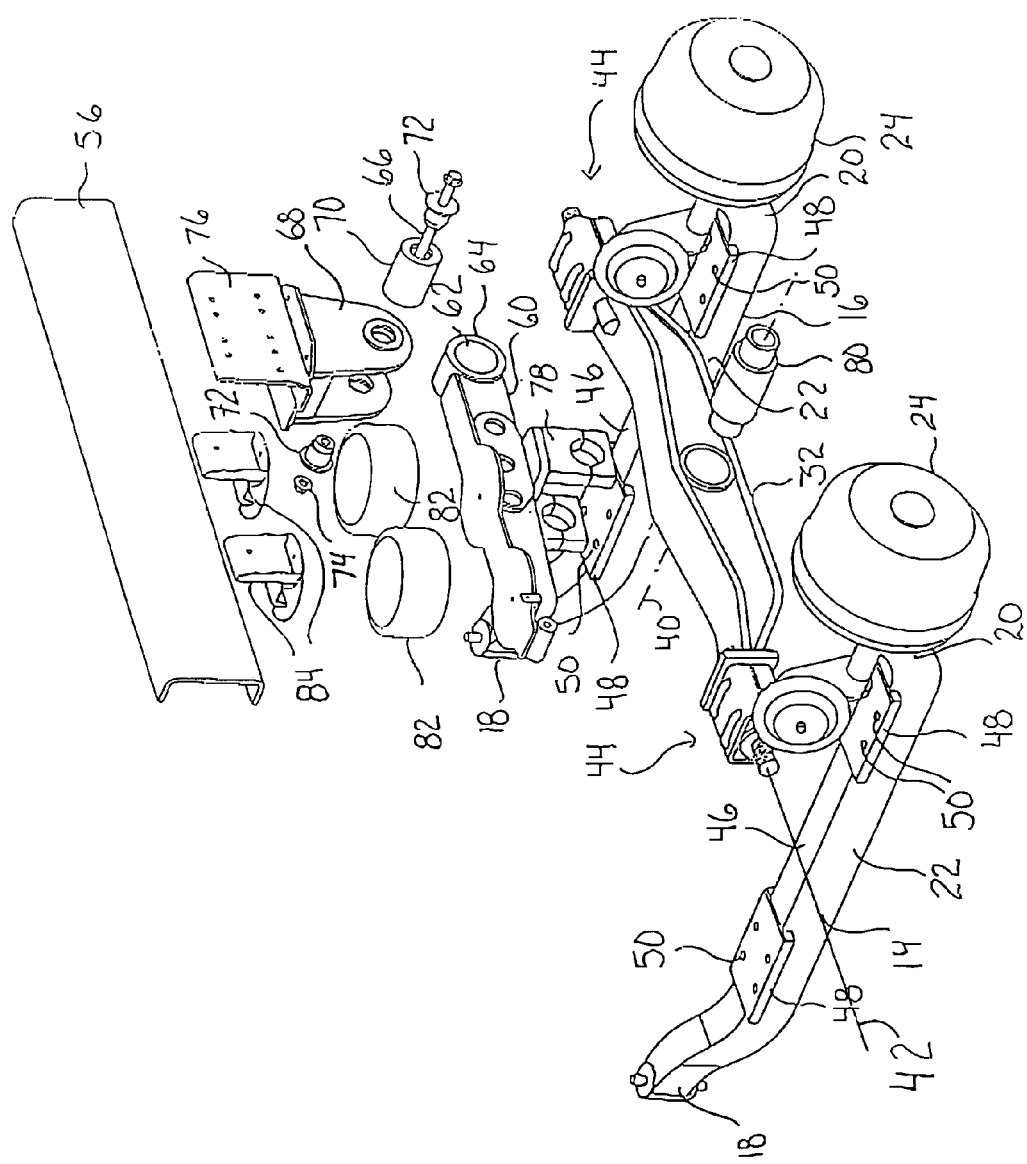
FIG. 4 is an exploded perspective view of the walking beam assembly illustrated in FIG. 1.

Referring to FIG. 1, a first walking beam 32 and a second walking beam 34 are arranged in parallel spaced relation. Referring to FIG. 3, each walking beam has a first end 36, a second end 38, and a central transverse pivot axis 40 intermediate first end 36 and second end 38. Referring to FIG. 4, each walking beam also has a longitudinal pivot axis, generally indicated by reference numeral 42. Referring to FIG. 1, first end 36 of first walking beam 32 is secured, via a connector generally indicated by reference numeral 44 which will hereinafter be further described, on top 46 of intermediate portion 22 of first drop axle 14 adjacent first end portion 18. Second end 38 of first walking beam 32 is similarly secured, via a connector 44, on top 46 of intermediate portion 22 of second drop axle 16 adjacent to first end portion 18. A first end 36 of second walking beam 34 is secured, via a connector 44, on top 46 of intermediate portion 22 of first drop axle 14 adjacent second end portion 20. A second end 38 of second walking beam 34 is similarly secured, via a connector 44, on top 46 of intermediate portion 22 of second drop axle 16 adjacent to second end portion 20.

Referring to FIG. 4, mounting plates 48 are positioned onto top 46 of intermediate portion 22 of each drop axle 14 or 16. Each of mounting plates 48 have bolt receiving apertures 50. Referring to FIG. 2, each of connectors 44 are secured in position by bolts, such as "U" bolts 52, which extend through apertures 50 and are secured by nuts 54.

Figure 7:
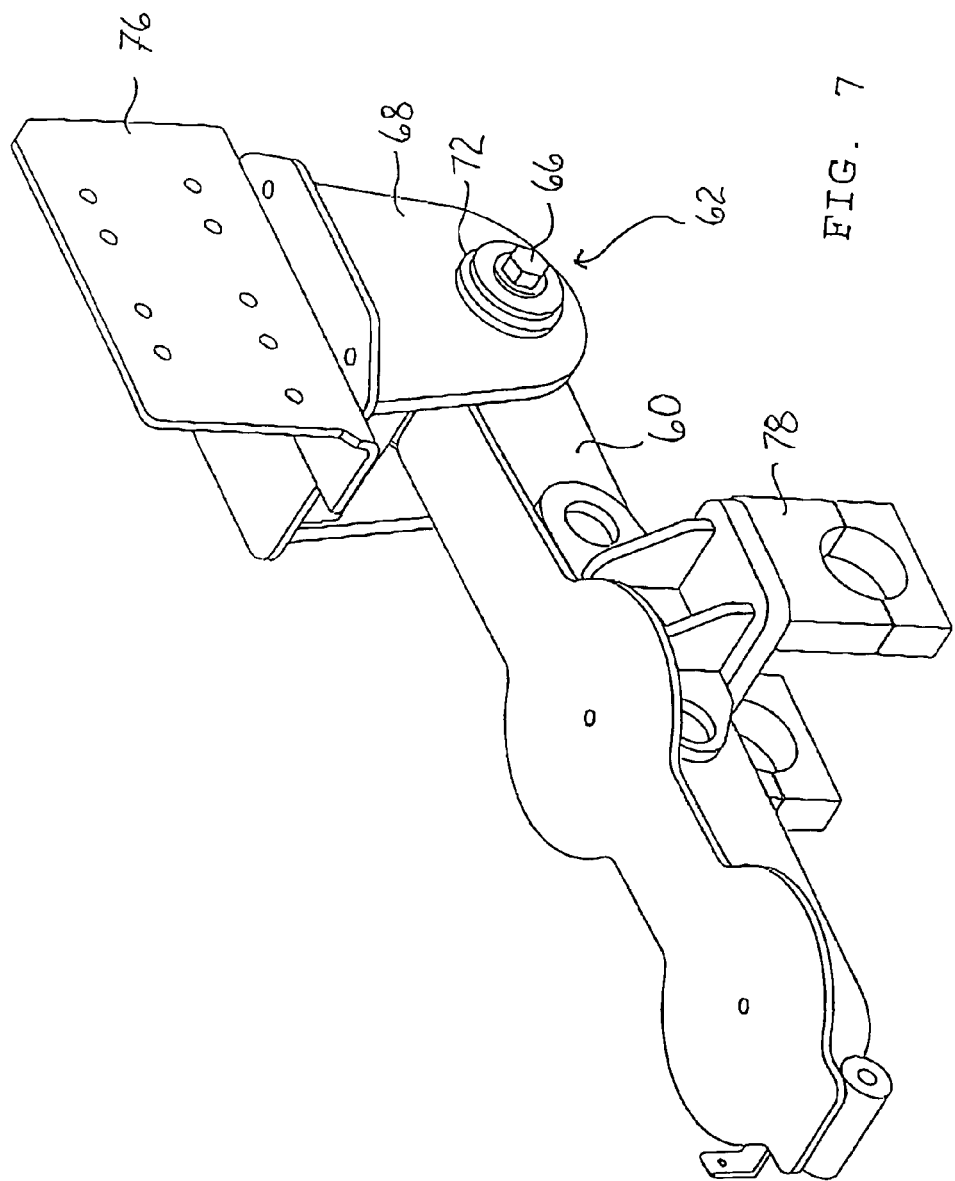
FIG. 7 is a detailed perspective view of a pivotal connection on the walking beam assembly illustrated in FIG. 1.
Figure 8:
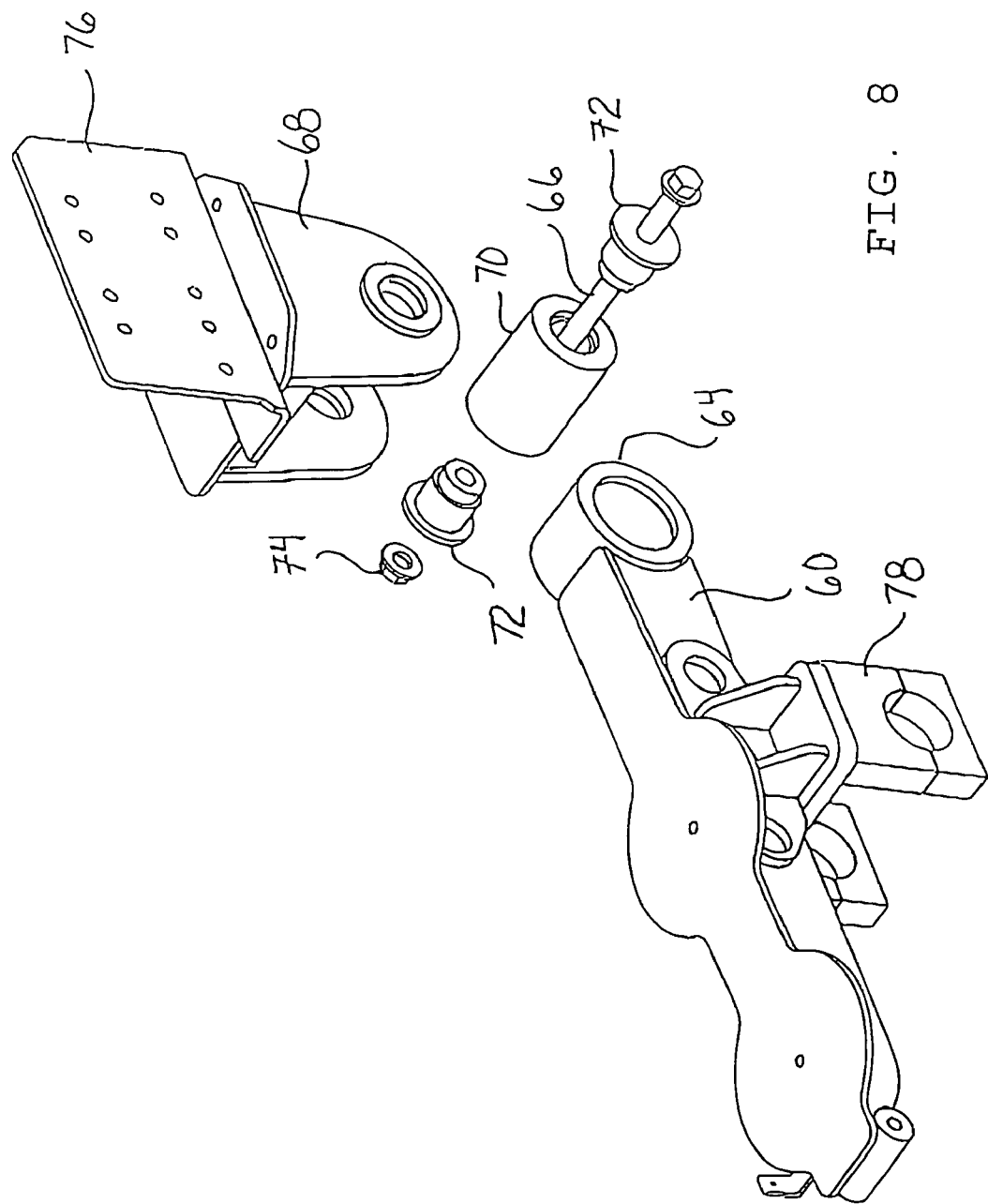
FIG. 8 is an exploded perspective view of the pivotal connection illustrated in FIG. 7.

Referring to FIG. 3, walking beams 32 and 34 must be secured in a longitudinal orientation to a vehicle frame 56 of a vehicle 58 for pivotal movement about central transverse pivot axis 40. Referring to FIG. 1, this is done with a pair of suspension arms 60. Referring to FIGS. 3 and 4, each suspension arm 60 has a pivotal connection generally referenced by numeral 62 at one end 64 adapted for pivotally securing suspension arm 60 to vehicle frame 56. Referring to FIG. 8, a pivot pin 66 extends through pivotal connection 62 to secure suspension arm 60 to a support bracket 68. In the illustrated embodiment, pivot pin 66 has a bushing 70, washers 72 and a fastening nut 74. This allows for pivot pin to be extended through pivotal connection 62, before placing fastening nut 74 on pivot pin 66 to prevent it from sliding out of pivotal connection 62. It will be appreciated that other forms of pivot pins 66 can also be used. Referring to FIG. 7, support bracket 68 is joined with a mounting bracket 76 which is attached onto vehicle frame 56 illustrated in FIG. 3.

Referring to FIGS. 3 and 4, a support bracket 78 depends from suspension arm 60. A pivot pin 80 is used to couple first walking beam 32 and second walking beam 34 to support bracket 78, so that they are pivotally supported for pivotal movement about central transverse pivot axis 40. Shock absorbers 82 disposed between suspension arm 60 and vehicle frame 56. The shock absorbers 82 illustrated are air springs. Shock absorbers 82 that are mounted to suspension arm 60 are secured by shock mounting brackets 84 to vehicle frame 56.

Figure 5:
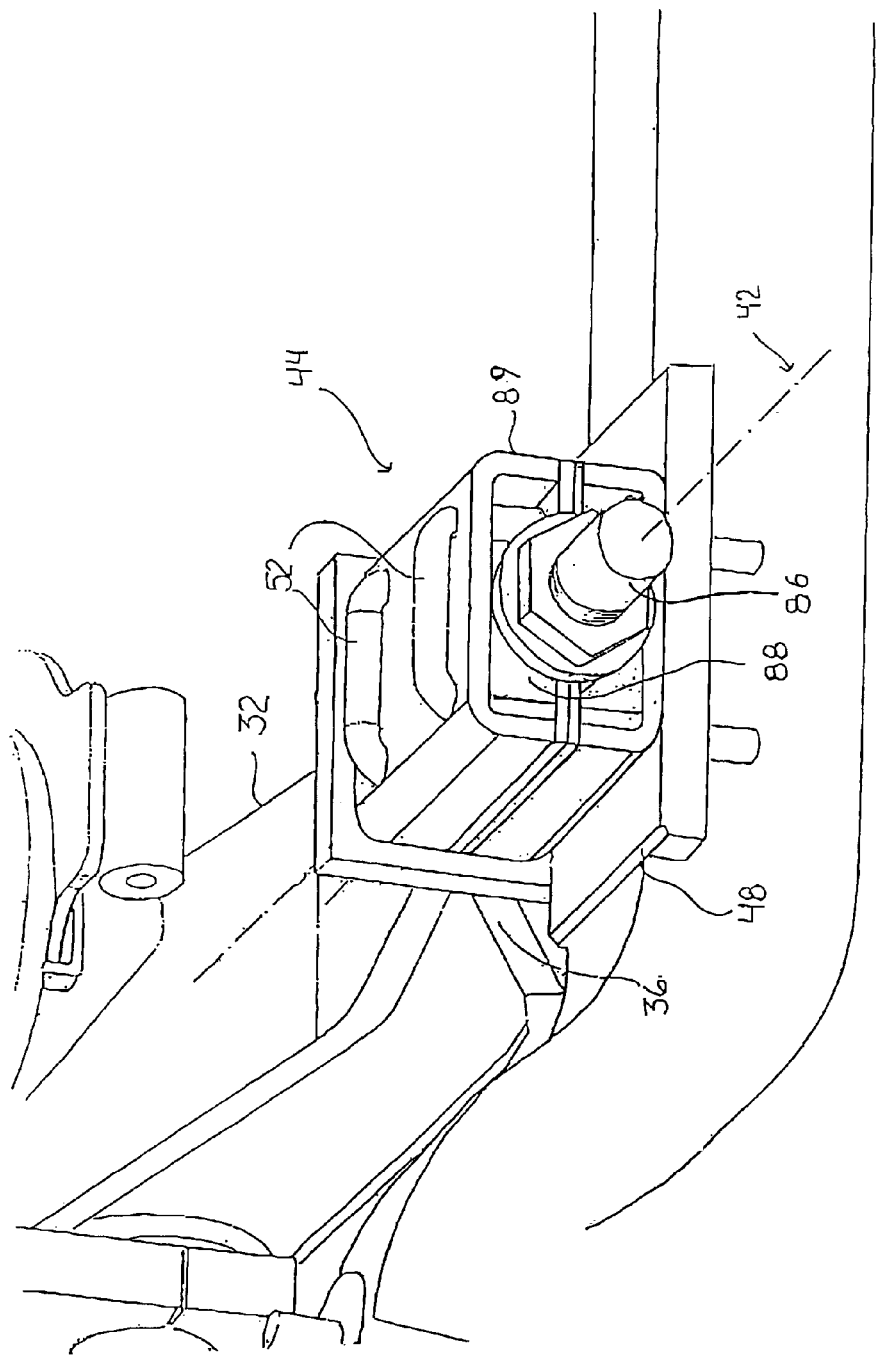
FIG. 5 is a detailed perspective view of a connector on the walking beam assembly illustrated in FIG. 1.

Referring to FIG. 5, each of connectors 44 must be capable of allowing limited pivotal movement about longitudinal pivot axis 42 of either first walking beam 32 or second walking beam 34. In the illustrated embodiment, each of connectors 44 includes a cylindrical pin 86 surrounded by a bushing 88 with an associated two part bushing housing 89, which is clamped in position on mounting plates 48 by "U" bolts 52. Cylindrical pin 86 rotates relative to bushing 88 to accommodate movement.

Operation:

Referring to FIG. 3, suspension arm 60 pivots up and down about pivot pin 66 which extends through pivotal connection 62, in response to impacts that wheels 24 sustain during the course of travelling over the terrain. The impacts are dampened by air springs, which have been identified as shock absorbers 82. Walking beam assembly 10 is capable of operating with or without the use of air in the air springs. Usually the air springs will be pressured with air. However, internal rubber stops in the air springs allow the suspension to operate without air.

Referring to FIGS. 2 and 5, connectors 44 allow first end portion 18 and second end portion 20 of either first drop axle 14 or second drop axle 16 to be at different elevations, such as when the vehicle is traversing uneven terrain. Cylindrical pin 86, rotates relative to bushing 88 within connectors 44 to accommodate this movement.

Referring to FIG. 3, central transverse pivot axis 40 of each of first walking beam 32 and second walking beam 34, allows for first drop axle 14 and second drop axle 16 to at different elevations and still be in contact with the terrain. This is accomplished by movement of first walking beam 32 and second walking beam 34 about pivot pin 80 which couples first walking beam 32 and second walking bean 34 to support bracket 78 which depends from suspension arm 60.

Walking beam assembly 10, as described, lowers the overall height of vehicle frame 56 and, thereby, reduces the over all height of vehicle 58. It adds additional room to accommodate the suspension. It increases ground clearance.

Variations:

In the shape of the walking beam—the walking beam illustrated has been shaped as a "drop" walking beam of a generally "W" shape to allow for the suspension to fit into the limited height between vehicle frame 56 and drop axles 14 and 16. If more height were available, the walking beam could be straight or even upwardly concave. The "drop" walking beam styling offers a means of connecting to drop axles in tandem to provide equal weight control, increased tire life, minimize maintenance and increase comfort and control to the operator. The "W" configuration allows the suspension above to work the articulation of the walking beam while minimizing interference.

It is possible that walking beam assembly 10 could include only one drop axle with a straight type axle at the other end. In this configuration, the straight axle is more likely to be a driving type axle.

In the suspension—walking beam assembly 10 can be used with a variety of suspension types. Shock absorbers 82 need not be air springs, a solid mount or rubber isolated style could be adapted to work equally well.

Figure 6:
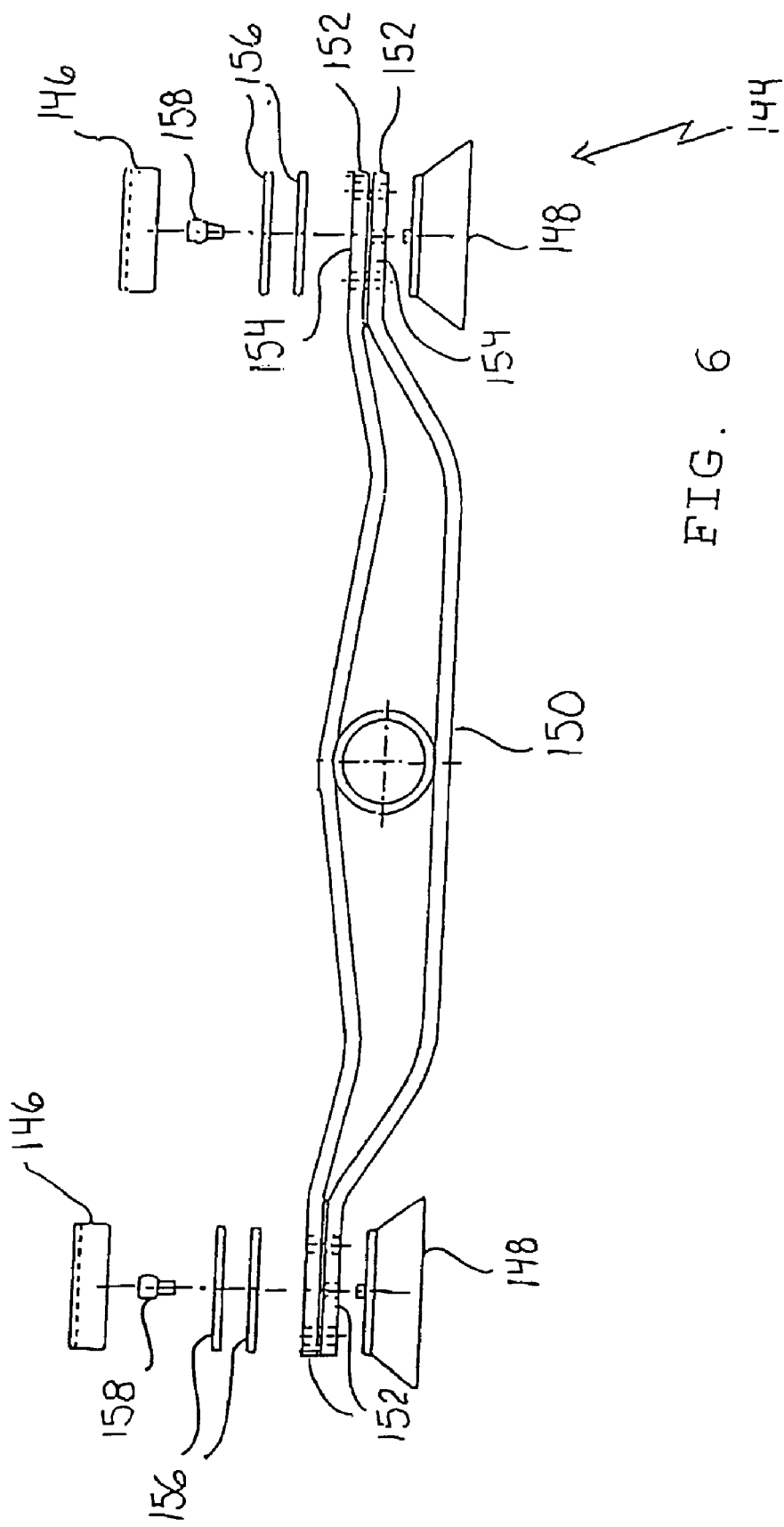
FIG. 6 is an exploded side elevation view of an alternative form of connector.

In the means of mounting onto the drop axles—the mounting onto the axle can be by means of clamps, brackets, bolts or "U" bolts. Similarly, the ends of the walking beams can be altered to suit the means of mounting. The key aspect is that connectors 44 must be capable of pivotal movement. Without the use of a pivotal connection, then the left and right sides of the drop axle are not free to be at different elevations and hence can not follow uneven terrain independently. Referring to FIG. 6, there is illustrated an alternative form of connector, generally indicated by reference numeral 144. Connector 144 includes an upper resilient flexible element 146 and a lower resilient flexible element 148. There is illustrated a walking beam 150 which has opposed ends 152 which form a flat tongues 154. Each flat tongue 154 of walking beam 150 is sandwiched between upper resilient flexible element 146 and lower resilient flexible element 148 with washers 156 and bolts 158. When in operation, upper resilient flexible element 146 and lower resilient flexible element 148 flex and deform to accommodate movement.

Figure 9:
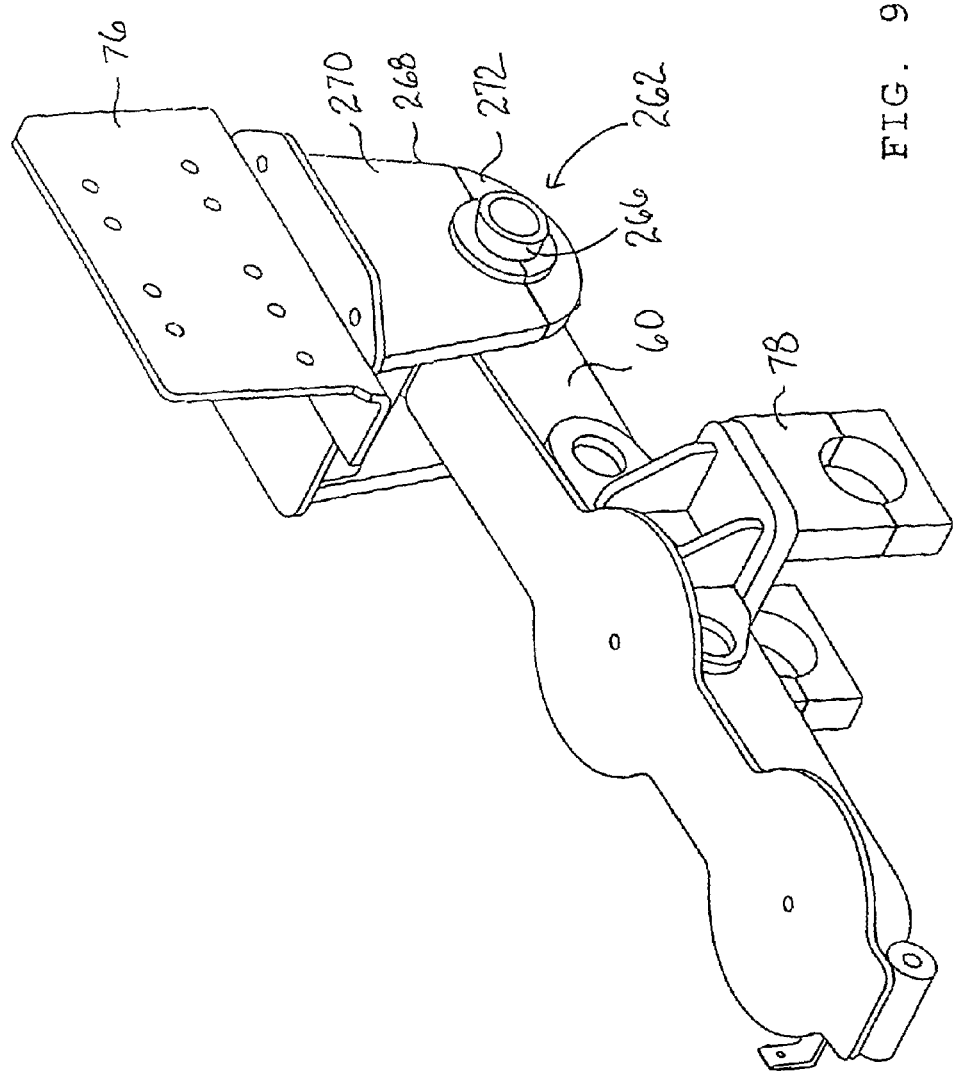
FIG. 9 is an exploded perspective view of an alternative form of pivotal connection.
Figure 10:
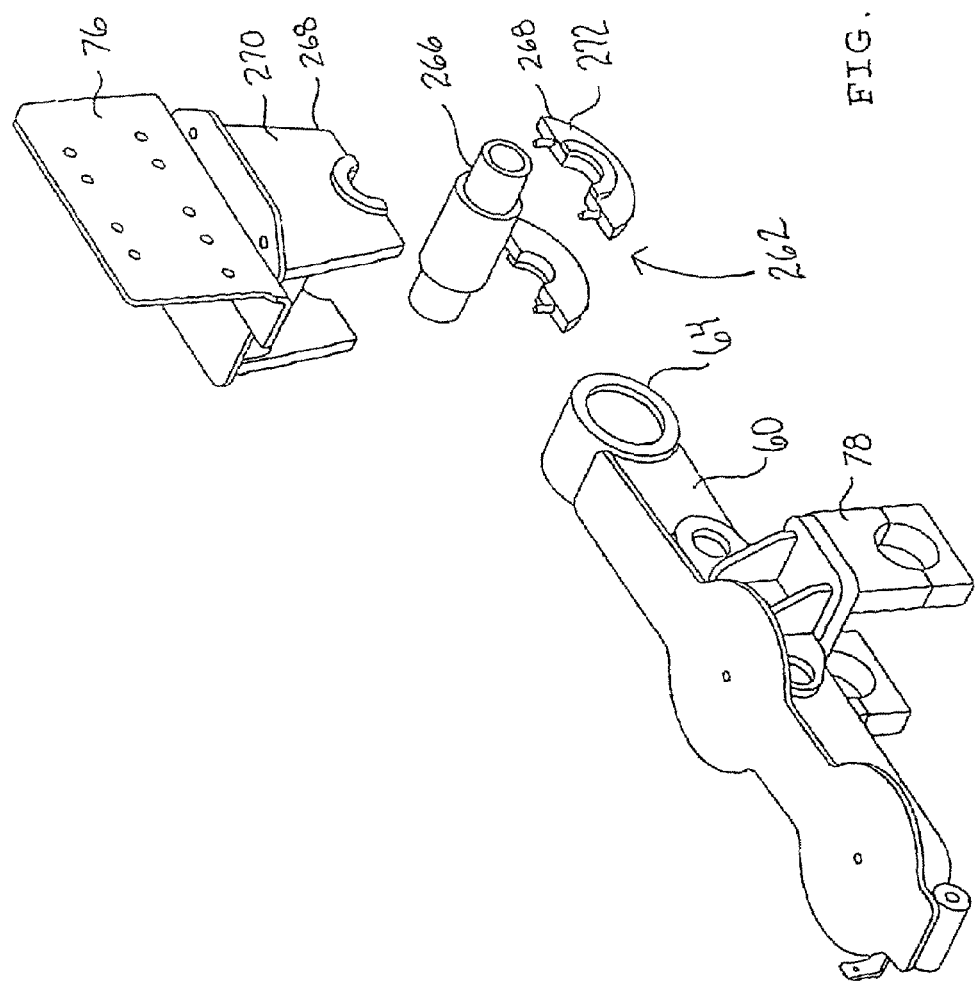
FIG. 10 is a detailed perspective view of the alternative form of pivotal connection illustrated in FIG. 9.

Referring to FIGS. 9 and 10 there is illustrated an alternative form of pivotal connection generally referenced by numeral 262 which is positioned at one end 64 of suspension arm 60. Pivotal connection 262 is adapted for pivotally securing suspension arm 60 to vehicle frame 56 illustrated in FIG. 3. Referring to FIG. 10, a pivot pin 266 extends through pivotal connection 262 to secure suspension arm 60 to a support bracket 268. Unlike with pivotal connection 62, pivot pin 266 does not need to be dissembled to position it in pivotal connection as a support bracket 268 is provided that has an upper portion 270 that is secured to mounting bracket 68, and detachable lower portions 272. Lower portions 272 can be detached to facilitate for placement of pivot pin 266 in pivotal connection 262, and then replaced to secure pivot pin 266 in position in pivotal connection 262.

Figure 11:
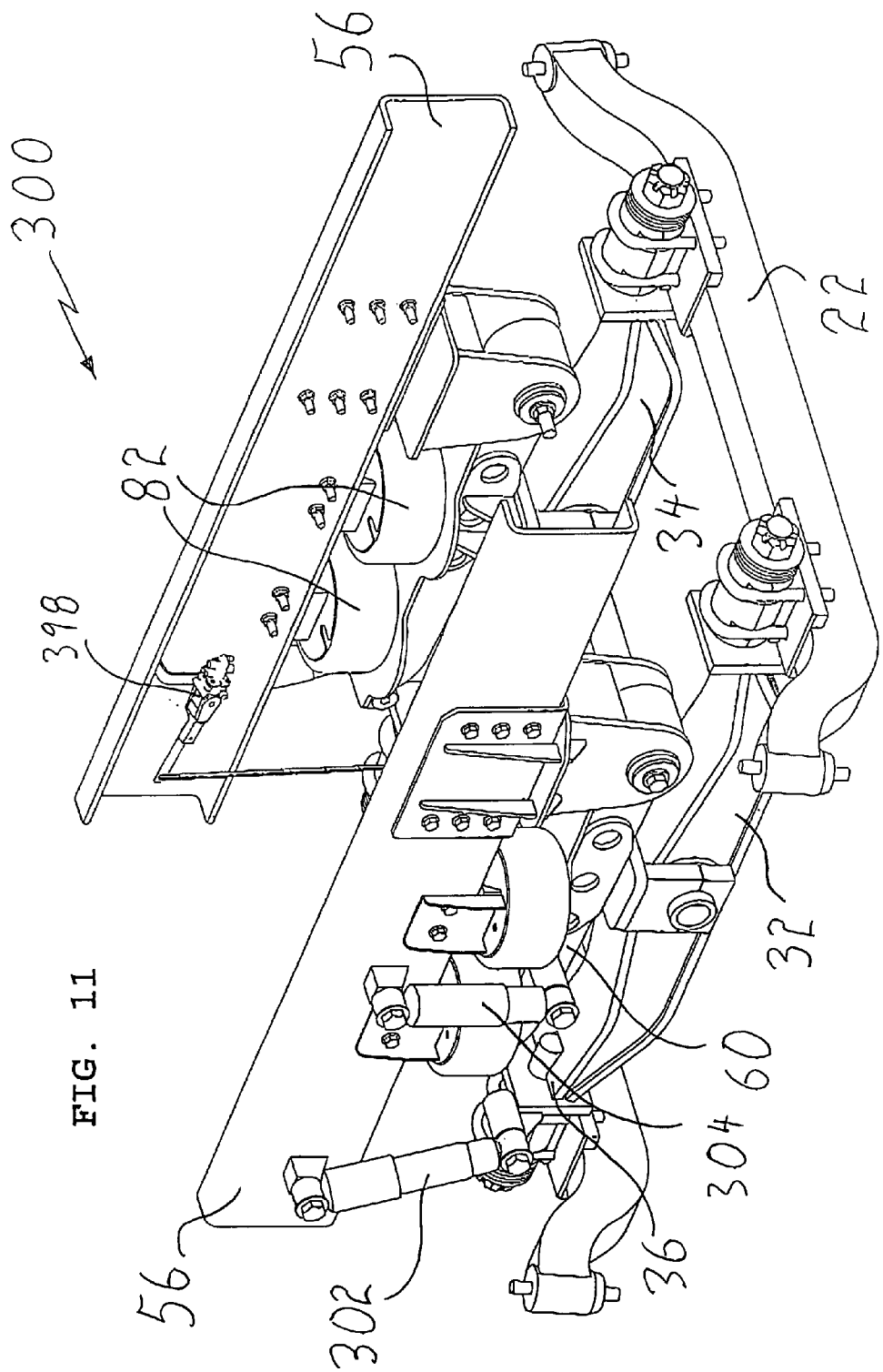
FIG. 11 is a perspective view of a commercial version of walking beam assembly constructed in accordance with the teachings of the present invention.
Figure 12:
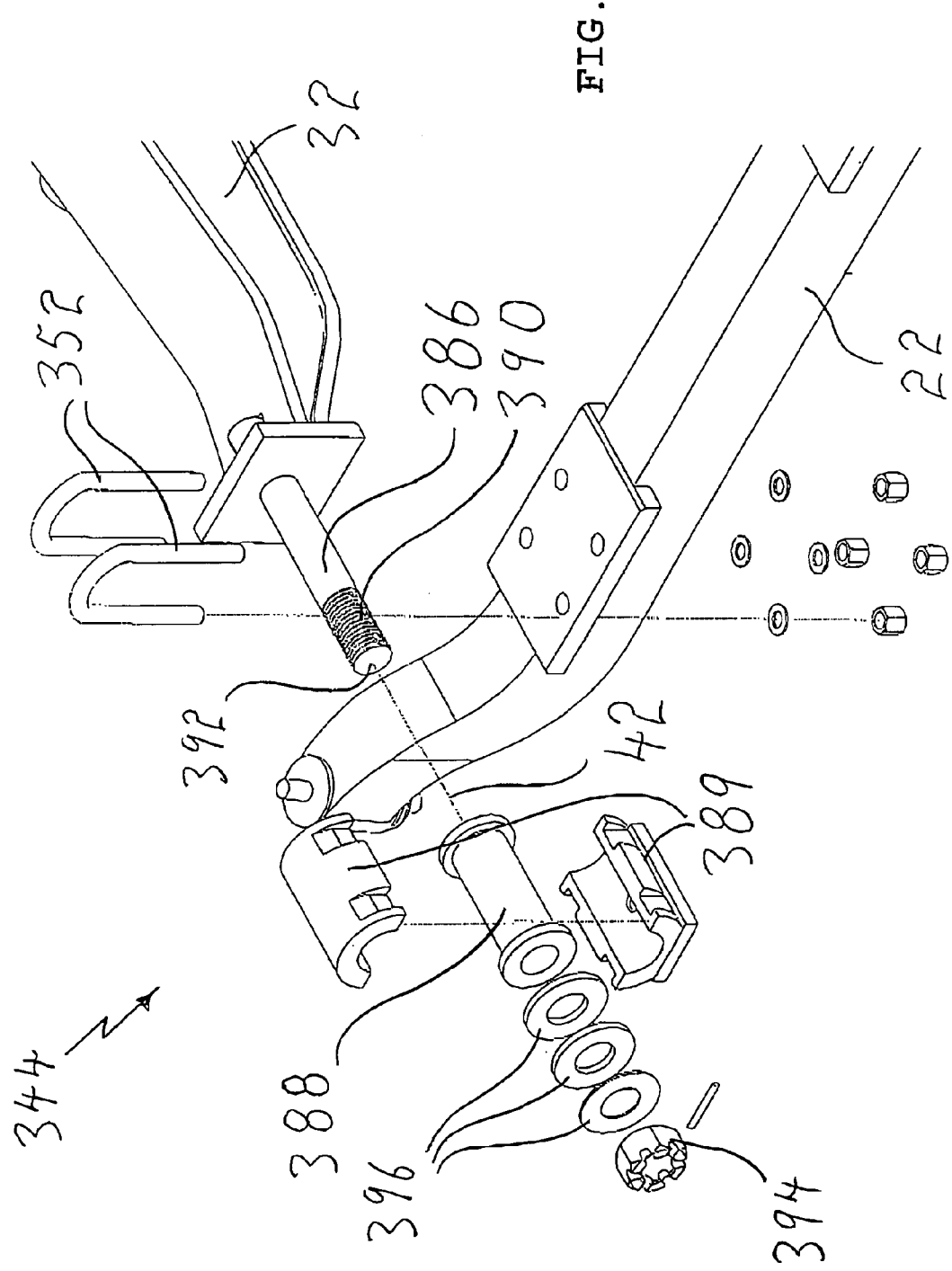
FIG. 12 is an exploded detailed perspective view of the walking beam assembly illustrated in FIG. 11.

Commercial Embodiment:

FIGS. 11 and 12 illustrate a commercial version of the walking beam assembly, generally identified by reference numeral 300, which represents the best known mode of implementing the teachings of the invention.

Referring to FIG. 11, in the commercial version of the walking beam assembly, hydraulic shock absorbers 302 and 304 have been included to hydraulically dampen movement. Shock absorbers 302 extend from vehicle frame 56 to first end 36 of each first walking beam 32 and second walking beam 34, in order to dampen movement of the walking beams. Shock absorbers 304 extend from vehicle frame 56 to suspension arm 60, in order to dampen movement off the suspension arms.

Referring to FIG. 12, the construction of connector 44 has been modified. The new construction is identified generally by reference numeral 344. Connector 344 still has a cylindrical pin 386 surrounded by a bushing 388 enclosed in a two part bushing housing 389 and secured in position by "U" bolts 352. The appearance of bushing 388 and two part bushing housing 389 has changed, but their function has not. The modification which is viewed as an improvement is the placing of threads 390 on ends 392 of cylindrical pins 386 of the walking beams (32 and 34). A nut 394 is provided which engages threads 390. This enables washers 396 to be added either in front of or behind connector 344 to act as shims to move the axle either ahead or back, as may be required for proper alignment. When making the adjustment by the addition of washers 396 as shims, nut 394 is removed, along with "U" bolts 352.

Referring to FIG. 11, a levelling valve 398 has been added that allows air to be selectively added or removed from one of the driver's side or passenger side air bags. In the illustration, levelling valve 398 is shown acting upon the driver's side air bags 82. It will be understood that there is a levelling valve on both the driver's side and the passenger side. This adjustment is used to level vehicle frame rails 56.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A walking beam assembly, comprising:
   a pair of axles in parallel spaced relation, at least one of the pair of axles being a drop axle having end portions and an intermediate portion that extends between the end portions, the intermediate portion dropping down and having a secondary axis which is offset from and substantially parallel to a primary axis provided by the end portions; and
   a pair of walking beams extending in parallel spaced relation between the pair of axles, each walking beam having opposed ends, a central transverse pivot axis intermediate the opposed ends, and a longitudinal pivot axis, the opposed ends of each walking beam being secured via connectors on top of the intermediate portion of the at least one drop axle adjacent one of the end portions, each of the connectors allowing limited pivotal movement about the longitudinal pivot axis of the walking beam;
   each of the connectors being a cylindrical pin surrounded by a bushing, each cylindrical pin rotating relative to the bushing to accommodate movement, each cylindrical pin being co-extensive with the longitudinal pivot axis; and
   each of the pair of walking beams being a drop walking beam with an intermediate portion along a top edge that drops down from the end portions, the central transverse pivot axis of the walking beams being positioned lower than the longitudinal pivot axis.

2. The walking beam assembly as defined in claim 1, wherein each of the pair of walking beams is "W" shaped.

3. A walking beam assembly, comprising:
   a pair of drop axles in parallel spaced relation, each of the drop axles having end portions and an intermediate portion that extends between the end portions, the intermediate portion dropping down and having a secondary axis which is offset from and substantially parallel to a primary axis provided by the end portions; and
   a pair of walking beams extending in parallel spaced relation between the pair of drop axles, each walking beam having opposed ends, a central transverse pivot axis intermediate the opposed ends, and a longitudinal pivot axis, the opposed ends of each walking beam being secured via connectors on top of the intermediate portion of the drop axles adjacent one of the end portions, each of the connectors allowing limited pivotal movement about the longitudinal pivot axis of the walking beam;

each of the connectors is a cylindrical pin positioned on the longitudinal pivot axis and surrounded by a resilient cylindrical bushing, the cylindrical pin rotating relative to the bushing to accommodate movement, the bushing being encased in a two part bushing housing;

mounting plates being positioned on top of the intermediate portion of each drop axle, each of the mounting plates having bolt receiving apertures, each of the cylindrical pins being secured in position by engaging the two part bushing housing, extending through the apertures and secured by nuts; and the cylindrical pin having a threaded end with a nut threaded onto the threaded end of the cylindrical pin, thereby facilitating the use of washers as shims on either side of the bushing.

4. The walking beam assembly as defined in claim 3, further including means to secure the walking beams in a longitudinal orientation to a frame of a vehicle for pivotal movement about the central transverse pivot axis.

5. The walking beam assembly as defined in claim 4, wherein the means to secure the walking beams in a longitudinal orientation to a vehicle frame, includes a pair of suspension arms, each suspension arm having a pivotal connection at one end adapted for pivotally securing the suspension arm to the vehicle frame, a support bracket for pivotally supporting the walking beams for pivotal movement about the central transverse pivot axis, and shock absorbers adapted to be disposed between the suspension arm and the vehicle frame.

6. The walking beam assembly as defined in claim 5, wherein air springs are used to dampen movement of each of the suspension arms.

7. The walking beam assembly as defined in claim 6, wherein at least one levelling valve is provided to allow air to be added or removed from one of driver's side or passenger side air springs, whereby the vehicle frame is levelled.

8. The walking beam assembly as defined in claim 3, wherein hydraulic shock absorbers are used to dampen movement of each of the walking beams.

9. A walking beam assembly, comprising:

a pair of drop axles in parallel spaced relation, each of the drop axles having end portions and an intermediate portion that extends between the end portions, the intermediate portion dropping down and having a secondary axis which is offset from and substantially parallel to a primary axis provided by the end portions;

a pair of walking beams extending in parallel spaced relation between the pair of drop axles, each walking beam having opposed ends, a central transverse pivot axis intermediate the opposed ends, and a longitudinal pivot axis, the opposed ends of each walking beam being secured via connectors on top of the intermediate portion of the drop axles adjacent one of the end portions, each of the connectors allowing limited pivotal movement about the longitudinal pivot axis of the walking beam; and each of the connectors consisting of resilient flexible elements which deform to accommodate movement, including an upper resilient element and a lower resilient element with one of the opposed ends of one of the walking beams sandwiched in between.

10. A walking beam assembly, comprising:

a first drop axle and a second drop axle, each of the first drop axle and the second drop axle having a first end portion, a second end portion, and an intermediate portion that extends between the first end portion and the second end portion, the first end portion and the second end portion supporting wheel mountings which are adapted to receive wheels, the intermediate portion dropping down and having a secondary axis which is offset from and substantially parallel to a primary axis provided by the first end portion and the second end portion;

a first walking beam and a second walking beam arranged in parallel spaced relation, each walking beam being "W" shaped and having a first end, a second end, a central transverse pivot axis intermediate the first end and the second end and a longitudinal pivot axis, the central transverse pivot axis of the walking beams being positioned lower than the longitudinal pivot axis;

a first end of the first walking beam being secured via a connector on top of the intermediate portion of the first drop axle adjacent the first end portion, a second end of the first walking beam being secured via a connector on top of the intermediate portion of the second drop axle adjacent to the first end portion;

a first end of the second walking beam being secured via a connector on top of the intermediate portion of the first drop axle adjacent the second end portion, a second end of the second walking beam being secured via a connector on top of the intermediate portion of the second drop axle adjacent to the second end portion;

each of the connectors is a cylindrical pin positioned on the longitudinal pivot axis and surrounded by a resilient cylindrical bushing, the cylindrical pin rotating relative to the bushing to accommodate movement, the bushing being encased in a two part bushing housing;

mounting plates being positioned on top of the intermediate portion of each drop axle, each of the mounting plates having bolt receiving apertures, each of the cylindrical pins being secured in position by bolts positioned engaging the two part bushing housing, extending through the apertures and secured by nuts;

the cylindrical pin having a threaded end with a nut threaded onto the threaded end of the cylindrical pin, thereby facilitating the use of washers as shims on either side of the bushing; and means to secure the walking beams in a longitudinal orientation to a vehicle frame for pivotal movement about the central transverse pivot axis, including a pair of suspension arms, each suspension arm having a pivotal connection at one end adapted for pivotally securing the suspension arm to the vehicle frame, a support bracket for pivotally supporting the walking beams for pivotal movement about the central transverse pivot axis, and air springs disposed between the suspension arm and the vehicle frame.

* * * * *